US006195735B1

(12) United States Patent
Krueger et al.

(10) Patent No.: US 6,195,735 B1
(45) Date of Patent: *Feb. 27, 2001

(54) PREFETCH CIRCUITY FOR PREFETCHING VARIABLE SIZE DATA

(75) Inventors: Steven D. Krueger, Dallas; Jonathan H. Shiell, Plano, both of TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/999,091

(22) Filed: Dec. 29, 1997

Related U.S. Application Data (60) Provisional application No. 60/034,135, filed on Dec. 31, 1996.

(51) Int. Cl.[7] .............................. G06F 12/00; G06F 9/30
(52) U.S. Cl. .......................... 711/204; 711/137; 711/213; 712/207
(58) Field of Search .................................. 711/137, 204, 711/118, 213, 171; 712/200, 207

(56) References Cited

U.S. PATENT DOCUMENTS

| | | | | |
|---|---|---|---|---|
| 3,898,624 | * | 8/1975 | Tobias ................................ 340/172.5 |
| 4,881,170 | * | 11/1989 | Morisada ............................ 364/200 |
| 5,317,727 | * | 5/1994 | Tsuchida et al. ..................... 395/600 |
| 5,361,391 | * | 11/1994 | Westberg ............................. 395/425 |
| 5,544,342 | * | 8/1996 | Dean .................................... 395/446 |
| 5,659,713 | * | 8/1997 | Goodwin et al. .................... 395/484 |
| 5,724,613 | * | 3/1998 | Wszolek .............................. 395/853 |
| 5,761,464 | * | 6/1998 | Hopkins .............................. 395/310 |
| 5,778,423 | * | 7/1998 | Sites et al. ........................... 711/118 |
| 5,778,435 | * | 7/1998 | Berenbaum et al. ................ 711/137 |
| 5,796,971 | * | 8/1998 | Emberson ........................... 395/383 |
| 5,809,529 | * | 9/1998 | Mayfield ............................. 711/137 |
| 5,835,967 | * | 11/1998 | McMahon ........................... 711/213 |
| 5,838,945 | * | 11/1998 | Emberson ........................... 395/376 |
| 5,970,508 | * | 10/1999 | Howe et al. ......................... 711/113 |
| 6,058,461 | * | 5/2000 | Lewchuk et al. ................... 711/158 |
| 6,085,291 | * | 7/2000 | Hicks et al. ......................... 711/137 |

OTHER PUBLICATIONS

IBM Technical Disclosure Bulletin, Method for Accessing Non–Bursting Regions in Local Bus Address Space without Pre–Fetching, vol. No. 37, Issue No. 42, pp. 399–400, Apr. 1994.*
Tabak, Advanced Microprocessor, Second Edition, pp. 159–161, Apr. 1994.*
Tabak DAniel, "Advanced Microprocessor", Second Edition, pp. 177–178, Dec. 1995.*

* cited by examiner

*Primary Examiner*—Do Yoo
*Assistant Examiner*—Kimberly McLean
(74) *Attorney, Agent, or Firm*—Robert D. Marshall, Jr.; W. James Brady, III; Frederick J. Telecky, Jr.

(57) ABSTRACT

A microprocessor (12) comprising a cache circuit (20) and circuitry (46, 48, 41, 56) for issuing a prefetch request. The prefetch request (82) comprises an address (82*a*) and requests information of a first size (82*b*) from the cache circuit. The microprocessor also includes prefetch control circuitry (22), which comprises circuitry for receiving the prefetch request and evaluation circuitry for evaluating system parameters corresponding to the prefetch request. Additionally, the prefetch control circuitry comprises circuitry, responsive to the evaluation circuitry, for determining a size of information for a prefetch operation starting at the address from the cache circuit, where the prefetch operation corresponds to the prefetch request.

6 Claims, 3 Drawing Sheets

PREFETCH CIRCUITRY FOR PREFETCHING VARIABLE SIZE DATA

This application claims priority under 35 USC 119 (e) (1) of provisional application No. 60/034,135, filed Dec. 31, 1996.

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

Microprocessor technology continues to advance at a rapid pace, with consideration given to all aspects of design. Designers constantly strive to increase performance, while maximizing efficiency. With respect to performance, greater overall microprocessor speed is achieved by improving the speed of various related and unrelated microprocessor circuits and operations. For example, one area in which operational efficiency is improved is by providing parallel and out-of-order instruction execution. As another example, operational efficiency also is improved by providing faster and greater access to information, with such information including instructions and/or data. The present embodiments are primarily directed at this access capability.

One very common approach in modern computer systems directed at improving access time to information is to include one or more levels of cache memory within the system. For example, a cache memory may be formed directly on a microprocessor, and/or a microprocessor may have access to an external cache memory. Typically, the lowest level cache (i.e., the first to be accessed) is smaller and faster than the cache or caches above it in the hierarchy, and the number of caches in a given memory hierarchy may vary. In any event, when utilizing the cache hierarchy, when an information address is issued, the address is typically directed to the lowest level cache to see if that cache stores information corresponding to that address, that is, whether there is a "hit" in that cache. If a hit occurs, then the addressed information is retrieved from the cache without having to access a memory higher in the memory hierarchy, where that higher ordered memory is likely slower to access than the hit cache memory. On the other hand, if a cache hit does not occur, then it is said that a cache miss occurs. In response, the next higher ordered memory structure is then presented with the address at issue. If this next higher ordered memory structure is another cache, then once again a hit or miss may occur. If misses occur at each cache, then eventually the process reaches the highest ordered memory structure in the system, at which point the addressed information may be retrieved from that memory.

Given the existence of cache systems, another prior art technique for increasing speed involves the prefetching of information in combination with cache systems. Prefetching involves a speculative retrieval, or preparation to retrieve, information, where the information is retrieved from a higher level memory system, such as an external memory, into a cache under the expectation that the retrieved information may be needed by the microprocessor for an anticipated event at some point after the next successive clock cycle. In this regard, the instance of a load is perhaps more often thought of in connection with retrieval, but note that prefetching may also concern a data store as well. More specifically, a load occurs where a specific data is retrieved so that the retrieved data may be used by the microprocessor. However, a store operation often first retrieves a group of data, where a part of that group will be overwritten. Still further, some store operations, such as a store interrogate, do not actually retrieve data, but prepare some resource external from the microprocessor for an upcoming event which will store information to that resource. Each of these cases, for purposes of this Background and the present embodiments to follow, should be considered a type of prefetch. In any event, in the case of prefetching where data is speculatively retrieved into an on-chip cache, if the anticipated event giving rise to the prefetch actually occurs, the prefetched information is already available in the cache and, therefore, may be fetched from the cache without having to seek it from a higher ordered memory system. In other words, prefetching lowers the risk of a cache miss once an actual fetch is necessary.

Given the above techniques, the present inventors have further recognized additional complexities relating to cache and prefetching techniques, particularly as the frequency of prefetching activities advance. Thus, below are presented various embodiments which address these as well as other considerations ascertainable by a person skilled in the art.

BRIEF SUMMARY OF THE INVENTION

In one embodiment, there is a microprocessor comprising a cache circuit and circuitry for issuing a prefetch request. The prefetch request comprises an address and requests information of a first size from the cache circuit. The microprocessor also includes prefetch control circuitry, which comprises circuitry for receiving the prefetch request and evaluation circuitry for evaluating system parameters corresponding to the prefetch request. Additionally, the prefetch control circuitry comprises circuitry, responsive to the evaluation circuitry, for determining a size of information for a prefetch operation starting at the address from the cache circuit, where the prefetch operation corresponds to the prefetch request. Other circuits, systems, and methods are also disclosed and claimed.

DETAILED DESCRIPTION OF THE INVENTION

Figure 1:
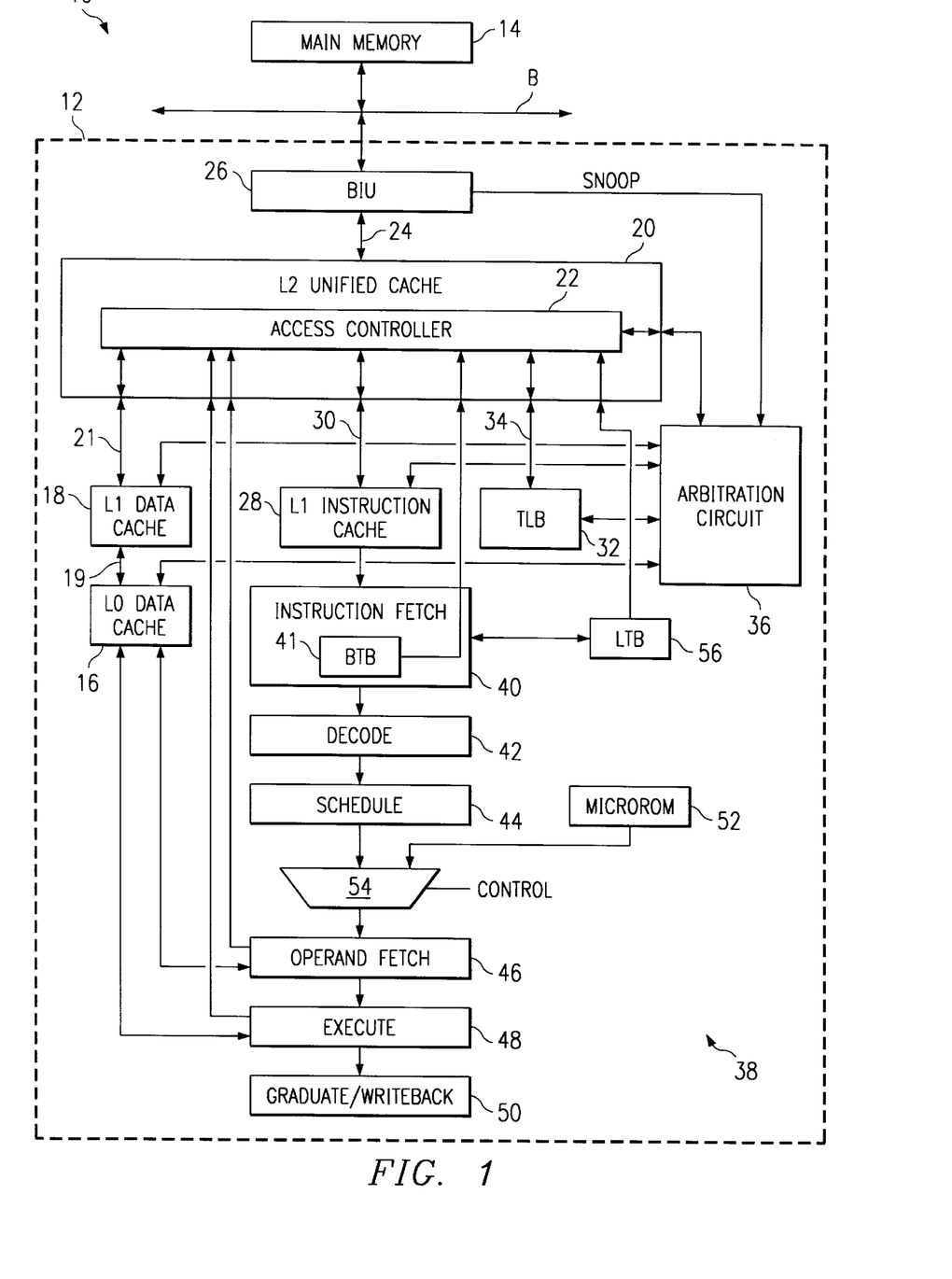
FIG. 1 illustrates an electrical diagram of a microprocessor having a multiple level memory system with various components for both fetching and prefetching information from that system.

FIG. 1 illustrates a block diagram of a microprocessor based system designated generally at 10 and in accordance with the present embodiments. System 10 includes a microprocessor 12 which has a bus B. As demonstrated below in connection with FIG. 4, bus B may connect to various external devices. However, for purposes of providing a context for the present embodiments, only an external memory 14 is shown connected to bus B, with additional items discussed later. Note also that microprocessor 12 may represent various different types of microprocessor structures. At this point, however, the details related to such a microprocessor other than in connection with the components of FIG. 1 are neither shown nor explained in order to simplify the present discussion. Instead, such a discussion is deferred until the detailed discussion of FIG. 4, below.

Turning to the blocks shown in FIG. 1, microprocessor 12 includes a memory hierarchy in a manner known in the art, that is, a hierarchy which reads and writes data starting from a lowest ordered storage system toward higher ordered storage systems. At the lowest level of such a system is a zero level data cache circuit, shown in FIG. 1 as L0 data cache 16. The "L0" indication demonstrates the matter of memory hierarchy as is known in the art. Specifically, cache circuits with a lower numerical designation are commonly closer to the execution unit of the microprocessor pipeline (described below) as compared to cache circuits with a higher numerical designation, such as the L1 and L2 data cache circuits discussed later. Moreover, the numerical designation of the cache provides an ascending indication of the order in which the caches are typically accessed when either reading from, or writing to, the caches. Thus, such an access first occurs to an L0 cache and, if a cache miss occurs to that cache, it is followed by an access to an L1 cache, and so forth through the memory hierarchy until a hit is found in either a cache or other memory structure. Returning to L0 data cache 16, in the present embodiment it is preferably a 4-way set associative cache operable to store a total of 1 Kbytes of data in 16 byte blocks, and with each way operable to output 64 bits (i.e., 8 bytes) at a time.

Microprocessor 12 further includes an L1 data cache 18, and which is connected to L0 data cache 16 via a bus 19. Again, the "L1" designation necessarily indicates that this cache is higher in the memory hierarchy as compared to L0 data cache 16. In the preferred embodiment, L1 data cache 18 is preferably a 2-way set associative cache operable to store a total of 8 Kbytes of data in 32 byte blocks, and with each way operable to output 128 bits (i.e., 16 bytes) at a time.

System 10 further includes an L2 unified cache 20, and which is connected to L1 data cache 18 via a bus 21. In the preferred embodiment, L2 unified cache 20 is preferably a 4-way set associative cache operable to store a total of 64 Kbytes of data in 64 byte blocks and 32 byte sub-blocks, and with each way operable to output 256 bits (i.e., 32 bytes) at a time. Note that the L2 cache is referred to as a unified cache, meaning in addition to storing data it stores other information as well. Specifically, as shown below, L2 unified cache 20 further stores instructions as well as address translation information. Note that in an alternative embodiment, however, the type or types of information stored may vary. In any event, with respect to data note then the memory hierarchy formed, that is, from L0 data cache 16, to L1 data cache 18, to L2 unified cache 20. Therefore, a first source giving rise to a potential addressing of L2 unified cache 20 is L1 data cache 18 in response to a miss in L1 data cache 18, which in turn arose from a miss in L0 data cache 16. Moreover, in each fetch instance causing a cache miss, data is sought at the next higher level of this hierarchy; thus, if a miss occurs at L2 unified cache 20, then the data is addressed from external memory 14. Note also that L2 unified cache 20 further includes an access controller 22. As detailed below, access controller 22 receives requests to access L2 unified cache 20, where those requests may be either for fetching or prefetching information from L2 unified cache 20.

Before discussing the other information paths shown in FIG. 1 relating to L2 unified cache 20, and completing the illustration of FIG. 1 in an upward sense toward bus B, note that L2 unified cache 20 is further connected by way of a bus 24 to a bus interface unit ("BIU") 26, and BIU 26 is connected to bus B. As suggested above, bus B permits external access from microprocessor 12 and, therefore, may control and perform communication between microprocessor 12 and other elements external from the microprocessor, including external memory 14 which one skilled in the art will appreciate is higher in the memory hierarchy than L2 unified cache 20 (and, of course, also higher than L1 data cache 18 and L0 data cache 16 as well). At this point, any additional elements external from microprocessor 12 are not detailed for sake of simplicity, with examples of such elements deferred until the discussion of FIG. 4, below.

As mentioned above, L2 unified cache 20 also stores instructions. In this regard, a second source giving rise to a potential addressing of L2 unified cache 20 is L1 instruction cache 28. Specifically, L1 instruction cache 28 is connected via a bus 30 to L2 unified cache 20. As its name implies, L1 instruction cache 28 stores instructions (as opposed to data as is stored in L1 data cache 18). In the preferred embodiment, L1 instruction cache 28 is constructed and sized in the same manner as L1 data cache 18 and, therefore, is preferably a 2-way set associative cache operable to store a total of 8 Kbytes of information; here, the information is instructions in 32 byte blocks, and each way is operable to output 128 instruction bits (i.e., 16 bytes) at a time.

A third source giving rise to a potential addressing of L2 unified cache 20 is a translation lookaside buffer ("TLB") cache 32. Specifically, TLB 32 is connected via a bus 34 to L2 unified cache 20. In the preferred embodiment, as is common in the microprocessor art, logical instruction addresses are translated to corresponding physical addresses. In this context, TLB 32 stores a table of some of the existing translations so that such translations may be accessed at subsequent times without having to re-calculate the translation. In addition, if there is a miss in the look up to TLB 32, then hardware associated with TLB 32 begins a table walk through page tables in main memory to determine the address translation. These main memory page table also may be stored, in part or whole, in L2 unified cache 20. In the preferred embodiment, TLB 32 is preferably 256 entries, 4-way set associative, and sized such that each lines stores a single translation.

Having noted the different levels of caches in FIG. 1, note further that each such cache is also connected to an arbitration circuit 36. Arbitration circuit 36 is included to demonstrate the general functionality of successive accesses to each cache based on a miss of a lower cache. For example, as mentioned above, if a cache access to L0 data cache 16 results in a cache miss, then L1 data cache 18 is accessed, followed by L2 unified cache 20, and so forth. Arbitration circuit 36, therefore, represents an arbitration control over this functionality, and may be implemented in various fashions by a person skilled in the art. Note further, however, that the inclusion of arbitration circuit 36 is not intended to impose any serialization of operation among the various caches of microprocessor 10, that is, each cache is still able to service requests and otherwise operate independent of the others. In any event, note also that arbitration circuit 36 also connects to access controller 22 of L2 unified cache 20. Thus, when an access request is to be presented to L2 unified cache 20 based on a miss of a lower-level cache, then arbitration circuit 36 presents this access request to access controller 22. As detailed below, however, access controller 22 also represents an additional level of control which may prioritize these requests and re-issue them to L2 unified cache 20 based on the priority.

A fourth source giving rise to a potential addressing of L2 unified cache 20 is any circuit providing a snoop request to L2 unified cache 20. As is known in the art, snooping is a function which ensures memory coherency through different levels in a memory hierarchy. The snoop request may be generated either internally or externally from the microprocessor. Typically, a snoop occurs by presenting an address to one or more levels of the memory system. In FIG. 1, this functionality is shown by way of a snoop address input from BIU 26 to arbitration circuit 36 which, in turn, may present the snoop address to any of the cache structures of FIG. 1. Each cache may be directed to respond in various manners to the snoop address. For example, the cache may be directed to merely confirm whether it stores information corresponding to the snoop address. As another example, the cache may be directed to output the information corresponding to the snoop address if it has such information. As yet another example, the cache may be directed to invalidate the information corresponding to the snoop address if it has such information. In any event, the snoop address poses yet another potential address to L2 unified cache 20.

Having presented the various components of the addressable memory hierarchy of microprocessor 12, reference is now turned to the components of the microprocessor which may require the addressable information from the memory hierarchy. In this regard, microprocessor 12 includes a pipeline designated generally at 38 and which may used to receive and process instructions in a complex instruction set computer ("CISC"). Pipeline 38 is shown by way of example as having six stages evenly numbered 40 through 50. Each of stages 40 through 50 is in some respects representative of a stage or stages known in the art, and may differ in name and/or function in different architectures. Thus, the following discussion is by way of example and without limitation to the inventive embodiments. Turning to pipeline 38, note generally that an instruction is retrieved at a beginning stage which in the present example is an instruction fetch stage 40. Instruction fetch stage 40 includes a branch target buffer ("BTB") 41 which may assist in instruction fetching in the context of branch instructions as known in the art. Instruction fetching by stage 40 occurs at a first level from L1 instruction cache 28 described above. Note also that some instruction fetches may stall the pipeline more than one clock cycle, particularly to access slower components of the memory hierarchy system. Typically, the received instruction is thereafter decoded in one or more decoding stages 42. While a pipeline may therefore include an integer number of decode stages, pipeline 38 includes only one such decode stage 42 by way of example, with it understood that typically the decode process is a multi-stage (i.e., multiple clock) process. The decode stage 42 (or stages) decompresses the more complicated instruction into one or more simple operations referred to in this document as micro-operation codes. These micro-operation codes typically may be executed in a single execution clock. Note also that micro-operation codes have different names depending on the architecture and/or manufacturer. For example, in the Texas Instruments' standard, micro-operation codes are referred to as atomic operations ("AOps"). These AOps, if completed in their entirety, represent completion and graduation of the instruction set instruction, including its opcode and operands if applicable. Note that AOps are approximately comparable to some RISC instructions and, thus, are the codes which are connected to various portions of the microprocessor to subsequently initiate execution of the decoded instruction. Thus, AOps are comparable to what is referred to in other architectures as ROps, $\mu$Ops, or RISC86 instructions.

After the micro-operation codes are generated from decode stage 42, schedule stage 44 schedules those codes to the corresponding appropriate execution units of the microprocessor. In some conventions, the scheduling stage is referred to as the issuing of each micro-operation code to its execution unit. For example, if a microprocessor includes three execution units (e.g., an arithmetic unit, a load/store unit, and a floating point unit), then a group of up to three micro-operation codes may be formed and assigned for execution in a single clock cycle by each corresponding execution unit. Indeed, a microprocessor may include more than three execution units, such as by having more than one arithmetic unit and more than one load/store unit. In such an event, the number of micro-operation codes to be executed in a single clock cycle may be increased accordingly. For purposes of a referring term to use in this document, the group of micro-operation codes, regardless of its size, is referred to as a "machine word." It is not uncommon for such a machine word to require 50 or more bits per execution resource and, therefore, a microprocessor with three execution units may operate in response to a machine word on the order of 150 bits in width.

Before discussing the stage following schedule stage 44, note further that machine words may come from a different source as an alternative to that described above, namely, from a microprogram memory 52 which often is referred to in the art as a microROM. Microprogram memory 52 is commonly a read only memory which is pre-programmed with various threads of machine words. The output of microprogram memory 52 is connected as an input to a multiplexer 54 as is the output of schedule stage 44. Consequently, multiplexer 54 may, in response to various control signals which need not be detailed here, provide a machine word from microprogram memory 52 to the next successive stage rather than a machine word from schedule stage 44. More specifically, an entry point address may be generated to microprogram memory 52 in which case the first machine word in such a thread is output, and then during each successive clock cycle a successive machine word in the thread may be output. Thus, by repeating this process, one of the entire threads from microprogram memory 52 is passed to the remainder of pipeline 38, which may then execute and complete each of the machine words in the microprogram memory thread.

After multiplexer 54, operand fetch stage 46 fetches any data necessary to execute any one or more of the micro-operation codes in the currently issued machine word. Typically, this data includes operands fetched from either registers or memory. In the context of retrieving data from memory, note that stage 46 is connected to L0 data cache 16 to seek data from that cache. Again, if a miss occurs at that cache level, one skilled in the art will therefore appreciate that the data may then be sought from a higher level, such as L1 data cache 18, L2 unified cache 20, or external memory 14. Note that like instruction fetches, some data fetches also may stall the pipeline more than one clock cycle.

Execution stage 48 includes numerous execution units, such as one or more arithmetic logic units, one or more load/store units, and a floating point unit. For each such unit, the unit executes its corresponding part of the machine word, that is, each execution unit performs its corresponding function on its assigned micro-operation code. Note also that one or more execution units of execution stage 48 also may access data and, therefore, stage 48 is also connected to L0 data cache 16 and, by that connection, has access to that cache as well as to the additional data storage structures higher than that cache in the memory hierarchy of microprocessor 12.

Lastly, stage 50 graduates the instruction, meaning it is allowed to complete and take its effect, if any, on the architected state of the microprocessor. In addition, the result of the instruction, if any, may be written to some store such as a register file. This last operation is commonly referred to as writeback, and sometimes is considered a function which is not part of the final pipeline stage, but which occurs at the same time the instruction is graduated.

Given the discussion presented thus far, one skilled in the art will appreciate that microprocessor 12 includes various circuits which may access information from its memory hierarchy, where that information may be either data, instructions, or address translation tables. Note that the accesses described to this point deal with actual fetches of such information, that is, the retrieval of information where that information is fetched directly into pipeline 38. Typically, the fetched information is then acted upon in the clock cycle immediately following the cycle in which it was fetched. For example, an instruction fetched in a first clock cycle by instruction fetch stage 40 may be decoded by decode stage 42 in the next clock cycle following the first clock cycle. As another example, data fetched in a first clock cycle by data fetch stage 46 may be used by an execution unit in execution stage 48 in the next clock cycle following the first clock cycle. Lastly, note that the types of accesses described above are only by way of illustration, and still others will be ascertainable by one skilled in the art. For example, certain instructions may access the memory hierarchy to fetch information into the pipeline when the instruction is at any of various different stages of the pipeline. Moreover, the discussion of pipeline 38 above is merely by way of example, and instructions therefore may fetch information into the pipeline when passing through various pipeline stages of other types of pipeline architectures (e.g., reduced instruction set computer) as known in the art.

Having discussed accessing information by fetching, note that system 10 further includes various circuits and methodology pertaining to information accesses which involve prefetching rather than fetching. Prefetching differs from fetching in that prefetched information is retrieved speculatively rather than being retrieved because of an actual need to act upon the information in the next clock cycle. In the present embodiments, prefetching is used to reduce access time through the memory hierarchy of system 10 as detailed below. Moreover, as introduced in the above Background, prefetching may involve the instance of a load, a data store, or a store interrogate. In any event, at this point some introductory discussion is presented to facilitate an understanding of the embodiments below. Recall that information stored in external memory 14 also may be stored in various caches, with the different caches characterized in part by their location in the memory hierarchy as well as the type of information stored by a given cache. In the instance of prefetching, when a prefetch is desired by one of various circuits within microprocessor 12 (those circuits being discussed below), the requesting circuit issues a prefetch request corresponding to the desired information.

Preferably, and as detailed below, the prefetch request includes at least the address of the desired information as well as some indication of the size (e.g., number of bytes) of the desired information. In the preferred embodiment, note that the prefetch request is coupled directly to L2 unified cache 20 as opposed to a lower level cache structure. In other words, unlike a fetch request, the prefetch request does not access the lowest level(s) of cache which may store the particular type of information being sought by the request. Note that this coupling to L2 unified cache 20 arises because in the preferred embodiment it is downward inclusive in its information, meaning that any information in a cache lower in order than L2 unified cache 20 is also stored in L2 unified cache 20. For example, if L1 data cache 18 stores a cache line of information, that same information is also stored in L2 unified cache 20. Consequently, if a prefetch operation is issued to L2 unified cache 20 resulting in a cache miss, then it is also known that none of the lower caches store the requested information as well and, therefore, it is beneficial to continue with the prefetch operation to bring the information on chip to L2 unified cache 20. Once the information is then brought on chip, if it is thereafter needed it is more readily accessible (i.e., at least in L2 unified cache 20) so an external access is not necessary. Moreover, if a prefetch operation is issued to L2 unified cache 20 resulting in a cache hit, then it is known that the information is then available from L2 unified cache 20, and may even be available from a cache lower in the hierarchy as compared to L2 unified cache 20. In either location, therefore, the information is accessible in a relatively short time period as compared with having to retrieve it from an off chip resource. In any event, note that once the prefetch request is presented to L2 unified cache 20, without additional intervention it generally may be confirmed that L2 unified cache 20 either stores that information, or that information may be retrieved into L2 unified cache 20 from a higher level memory. Alternatively, the prefetched information may be stored in some other resource within microprocessor 12, such as within a group of prefetch buffers, where those buffers are either a part of L2 unified cache 20 or are a separate structure. In any event, once the information is prefetched, and if the speculative prefetch is correct, that is, if the information is thereafter needed for an actual fetch, then it is accessible from a cache (i.e., L2 unified cache 20) or other on-chip resource and, therefore, access time to the information is minimized.

Given the above discussion of prefetching, note further that it raises two considerations addressed by the present embodiments below. First, there is the consideration of which circuit may issue a prefetch. Second, it is stated above that the access of prefetch information proceeds with respect to L2 unified cache 20 in the above manner in the absence of additional intervention; however, as demonstrated below, the present embodiments provide circuits and methodology which in some instances intervene in the prefetch function described above, as further detailed below.

As introduced above, various circuits may issue a prefetch request in the preferred embodiment. In this regard, note first that some of the above circuits which may issue an actual fetch also may issue a prefetch request. For example, execution stage 48 may issue a prefetch request for data, such as by operation of its one or more load/store units. As another example, while BTBs are known in the art to issue actual fetches for instructions (i.e., for placement into the pipeline for immediate decoding or the like), under the present embodiment BTB 41 of instruction fetch stage 40 also may issue a prefetch request so that one or more instructions are prefetched into L2 unified cache 20. Indeed, in this regard, the reader is referred to U.S. patent application Ser. No. 08/994,596 entitled "Combined Branch Prediction And Cache Prefetch In A Microprocessor" (Attorney Docket Number TI-24154), assigned to the same Assignee as the current patent, filed Dec. 19, 1997, now U.S. Pat. No. 6,119,596, and which is hereby incorporated herein by reference. Microprocessor 12 includes additional circuits which also may issue a prefetch request. Specifically, note now that microprocessor 12 further includes a load target buffer ("LTB") 56 connected to L2 unified cache 20. LTB 56 in certain respects may be thought of in connection with data in the same manner as BTB 41 is thought of in connection with instructions. In other words, LTB 56 includes addresses of certain data fetching instructions and predictions based on which data will be used by those instructions in the future by microprocessor 12. Thus, once the data fetching instruction is itself fetched into pipeline 38, LTB 56 may be consulted to determine if it has an entry corresponding to the data fetching instruction. If so, and based on the prediction and possibly other information corresponding to the data fetching instruction, LTB 56 may then issue a prefetch request to L2 unified cache 20 Without other intervention, the prefetch request propagates from L2 unified cache 20 upward through the memory hierarchy so that the data is confirmed to be currently on-chip (i.e., within one of its caches) or so it may be retrieved onto the microprocessor in response to the prefetch request. Thus, once retrieved, the data is available for subsequent use once the data fetching instruction requires the data as the instruction passes through pipeline 38. For more information on LTB 56, the reader is referred to U.S. Pat. No. 5,953,512 entitled "Microprocessor Circuits, Systems, And Methods Implementing a Loop And/Or Stride Predicting Load Target Buffer" (Attorney Docket Number TI-24087), assigned to the same Assignee as the current patent, filed on the same date as the current patent, and which is hereby incorporated herein by reference, as well as U.S. patent application Ser. No. 09/000,937 entitled "Microprocessor Circuits, Systems, And Methods Implementing a Load Target Buffer Having Entries Of Varying Lengths Based On Prefetch Desirability" (Attorney Docket Number TI-25204), assigned to the same Assignee as the current patent, filed on the same date as the current patent, and which is hereby incorporated herein by reference.

Figure 2:
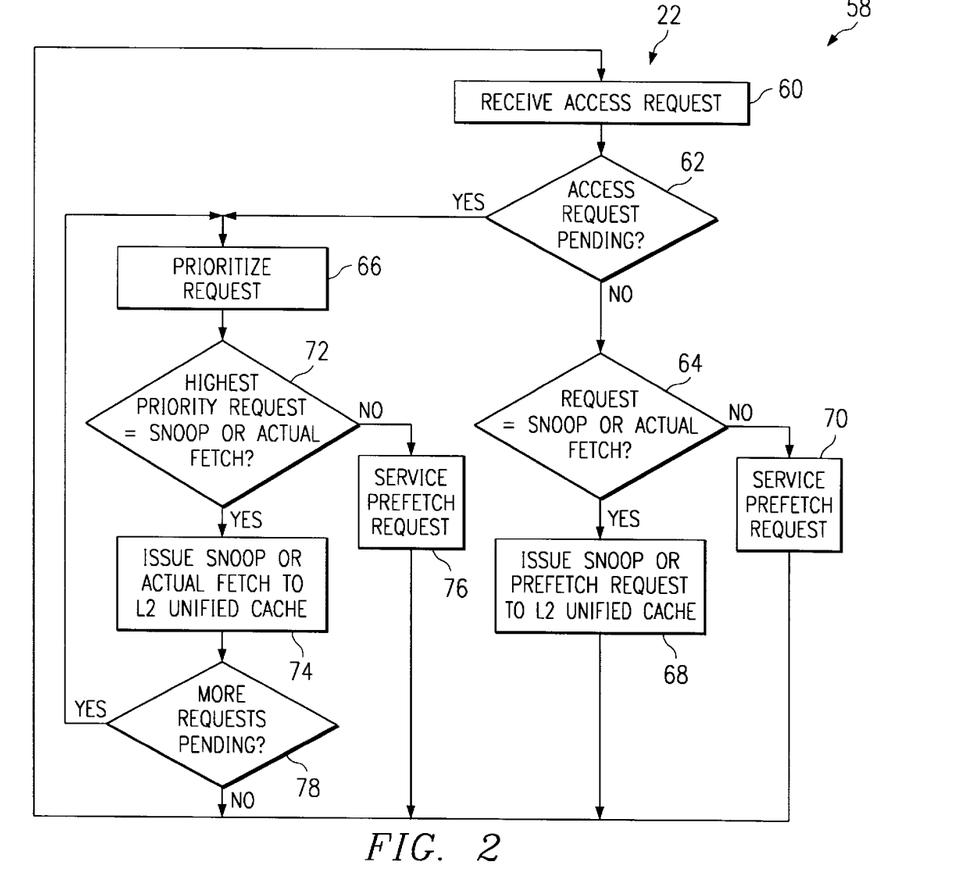
FIG. 2 illustrates a flow chart of the method of operation of the access controller within the L2 unified cache of FIG. 1.

Recall it is introduced above that a prefetch request may propagate from L2 unified cache 20 upward through the memory hierarchy without additional intervention. Recall also that L2 unified cache 20 further includes an access controller 22 which receives each request to access L2 unified cache 20, where those requests may be either for fetching or prefetching information from L2 unified cache 20. Given these combinations, note now that access controller 22 provides prioritization of certain access requests, and also may modify certain requests, each of which is now discussed in greater detail in connection with the flow chart of FIG. 2. Thus, FIG. 2 illustrates a method designated generally at 58, and which depicts the operation of access controller 22. Before proceeding, note that method 58 may be embodied in various manners, such as in a programmable logic array, a state machine, a combination of the two, or other techniques ascertainable by a person skilled in the art. In any event, turning to method 58, it begins with a step 60 where access controller 22 receives a request to access L2 unified cache 20. From the above, one skilled in the art will appreciate that such a request may be a snoop request, a fetch request, or a prefetch request. Next, step 62 determines whether any other access requests are currently pending for L2 unified cache 20. In other words, given that various sources may issue an access request to L2 unified cache 20, it is contemplated by the present embodiment that one such access may be in the process of being serviced while one or more additional requests are received. In this event, access controller 22 includes circuitry for pending any such additional requests, that is, storing them such that each may be reviewed and responded to according to method 58. Returning then to step 62, if no other access requests are pending, method 58 continues to step 64. On the other hand, if one or more other access requests are pending, method 58 continues to step 66. Each of these alternative method paths is described below.

Step 64, having been reached because no other access is pending, determines whether the currently received access request is a snoop request, a fetch request, or a prefetch request. In the case of either a snoop request or a fetch request, method 58 continues to step 68, whereas in the case of a prefetch request, method 58 continues to step 70. In the instance of reaching step 68, method 58 issues the request to L2 unified cache 20. Thus, L2 unified cache 20 responds based on whether the request is a snoop request or a fetch request, each of which is discussed below.

In the instance of a snoop access request, step 68 presents the snoop address and additional control signals to perform the desired snoop activity. As known in the art, snooping permits cache structures to maintain proper memory coherency. Thus, if a snoop address is presented to L2 unified cache 20, it responds based on the type of action corresponding to the snoop. Numerous examples of snoop requests were discussed above, such as requesting confirmation of whether L2 unified cache 20 stores the addressed information, requesting a cast out operation, and/or requesting an invalidate. These as well as other snoop techniques may therefore be included, and such techniques are known in the art such as demonstrated by Section 8.3 of the text "Computer Architecture A Quantitative Approach", second edition, by Hennessy and Patterson, 1996, publisher Morgan Kaufmann Publishers, Inc., where that section is entitled "Centralized Shared-Memory Architectures," and which is hereby incorporated herein by reference.

In the instance of a fetch request, step 68 presents the fetch request to L2 unified cache 20 which determines whether the address within the fetch request corresponds to an address of information stored within L2 unified cache 20. If so, a cache hit occurs and the addressed information is placed on the appropriate bus for access by the circuit requesting the access. If a miss occurs in L2 unified cache 20, then arbitration circuit 36 is so notified and the addressed information is then accessed from some higher level of memory, such as from external memory 14, and again placed on the appropriate bus for access by the circuit requesting the access.

Having discussed snoop and fetch request presentation, recall that step 70 is reached if the current request is a prefetch request. In response, step 70 services the prefetch request based on various system parameters corresponding to the prefetch request. More particularly, depending on various system parameters discussed below, the received prefetch request may be either issued as is to L2 unified cache 20, suppressed by access controller 22, or modified by access controller 22. The preferred methodology of these actions is discussed in greater detail later after reviewing the others steps presented by method 58.

Returning to step 62, recall that method 58 continues to step 66 if more than one access request is pending at a time.

Next, therefore, step 66 prioritizes the two or more pending access requests. In other words, each of the pending requests is analyzed and the one with the highest priority is then processed according to the steps following step 66 as demonstrated below. Before reaching those steps, note that the preferred prioritization of step 66 is based first on the type of the access. More particularly, snoop requests are given highest priority, followed by fetch access requests, followed by prefetch access requests. Beyond this first level, however, priority is determined based on which circuit requested the access, as shown in the following Table 1.

TABLE 1

| REQUESTING CIRCUIT | PRIORITY LEVEL |
|---|---|
| snoop address | 1 |
| TLB 32 (TLB fetch request) | 2 |
| Data fetch stage 46 (data fetch request) | 3 |
| Data execute stage 48 (data fetch request) | 4 |
| Instruction fetch stage 40 (instruction fetch request) | 5 |
| Data execute stage 48 (data prefetch request) | 6 |
| LTB 56 (data prefetch request) | 7 |
| BTB 41 (instruction prefetch request) | 8 |

Table 1 lists the highest priority as priority 1 and, therefore, the lowest priority as priority 8. Thus, one skilled in the art will appreciate that a snoop request is the highest priority access, followed by four types of fetch requests, and then followed by three types of prefetch requests. Of course, if additional requesting circuits are included within microprocessor 12, additional entries could be made to Table 1 by one skilled in the art, either with or without re-arranging some of the priorities therein.

After step 66 prioritizes the pending access requests according to Table 1, step 72 determines whether the pending request with the highest priority is in one of two groups, the first group including snoop requests and fetch requests, and the second group being prefetch requests. If the highest priority access request is in the first group, method 58 continues to step 74. On the other hand, if the highest priority access request is in the second group, method 58 continues to step 76.

Step 74 issues the request from the first group to L2 unified cache 20 in the same manner as step 68 described above. Thus, the reader is referred to the above discussion of step 68 for those details, as they apply to the presentation of both snoop requests and information fetch requests. In either event, once the request is presented to L2 unified cache 20, method 58 continues to step 78.

Step 78 determines whether additional access requests to L2 unified cache 20 are still pending. If so, method 58 returns to step 66 which, as detailed above, prioritizes the remaining request(s). Of course, if only a single access request is then pending, it has the highest priority. On the other hand, if more than one access request is still pending, the access request with the highest priority based on Table 1 is next processed. Given the return of flow from step 78 to step 66 in this manner, one skilled in the art will appreciate that each pending access request is eventually processed until a time when step 78 is reached and no access requests are pending. In this event, method 58 returns to step 60 and awaits receipt of the next access request to L2 unified cache 20.

Figure 3:
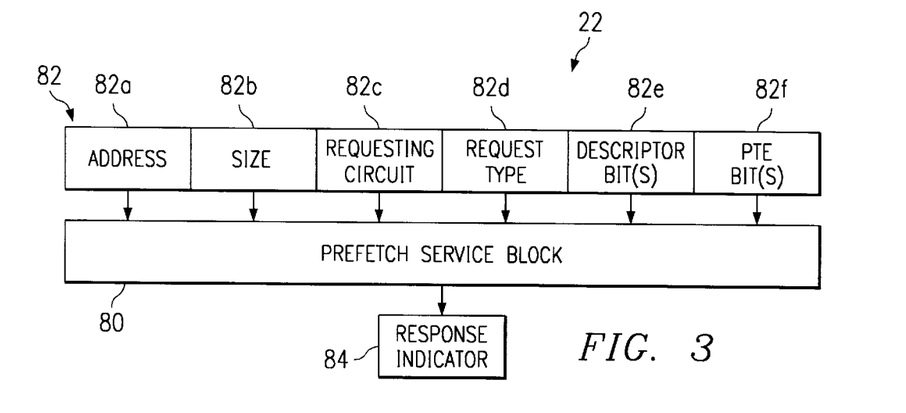
FIG. 3 illustrates an electrical diagram a prefetch service block of the access controller of FIG. 1 connected to receive a prefetch request and output a bit pattern directed to the processing of the prefetch request.

Having presented the operation of access controller 22 to implement method 58 of FIG. 2, recall that both step 70 and step 76 result in the servicing of a prefetch request (as opposed to either a snoop request or a fetch request). In this regard, FIG. 3 illustrates a block diagram of a configuration within access controller 22 for servicing the prefetch request in either the instance of step 70 or step 76. Turning to FIG. 3, a prefetch service block 80 is shown which receives a prefetch request 82 which includes various system parameter inputs described below. Generally, and also as demonstrated in more detail below, prefetch service block 80 outputs a response indicator 84, such as a bit pattern, which directs the type of response, if any, to be taken in response to a given prefetch request 82. Prefetch service block 80 may be included within the circuitry used to perform the functionality of access controller 22. Still further, for the functionality set forth below of providing response indicator 84 based on prefetch request 82, still another embodiment may be a memory or some other programmable device which operates to output the desired response indicator 84 based on the different values of the input system considerations. Indeed, still other approaches may be ascertained by a person skilled in the art, particularly given the functional description of prefetch service block 80 set forth below.

Looking to prefetch request 82, it preferably includes six portions designated 82a through 82f. The first two portions 82a and 82b are the address of the information to be prefetched, as well as the size of the information, both of which are stated above as preferably included within the prefetch request. Preferably, the size portion 82b is in units of bytes, but the unit type may be altered by a person skilled in the art. Note also that the size portion of the prefetch request may be implicit in the request or in the architecture (e.g., all prefetch requests are for a given number of bytes) rather than expressly setting forth a number in prefetch request 82. Any of these alternatives, therefore, effectively request information of a given size whether the request is express or implicit, and each of these alternatives are also contemplated as within the present inventive scope. The third portion 82c of prefetch request 82 designates the requester of the prefetch, that is, the circuit which issued the request. For example, as discussed above, such a requestor may be LTB 56, execute stage 48, BTB 41, or still other circuits as well. Next, fourth portion 82d indicates the type of the request. Request types may take various forms. For example, two more straightforward prefetch types are requests to prefetch data or instructions. As another example, however, the request may be a data store interrogate. In this case, the data store interrogate is merely a request to prepare some memory structure to receive data, but no data is actually retrieved. Alternatively, the request may be a data fetch store interrogate. Here, like the data store interrogate, the request again seeks to prepare some memory structure to receive data; in addition, however, here a group of data is retrieved into a cache as part of the preparation, with the anticipation that part of that group will be overwritten by a subsequent store to that group. Still other types of requests will be ascertainable by a person skilled in the art. Lastly, note that prefetch request 82 may include additional portions which assist in the modification functionality described below. In this regard, where microprocessor 12 is an 80×86 compatible microprocessor, two such preferred additional portions are shown at 82e and 82f of FIG. 3. Specifically, portion 82e corresponds to one or more bits from a segment descriptor associated with the information to be retrieved. For example, in the 80×86 art, these bits could be from either the code segment or stack segment description. Portion 82f corresponds to one or more bits from the page table entry. For example, in the preferred embodiment, the "G" bit from the page table entry is part of prefetch request 82, where that bit is the known global bit in the 80×86 page table entry. Indeed, for more information on the "G" bit as well as the page table entry, the reader is referred to pp. 3–21 through 3–26 of the Pentium Pro Family Developer's Manual, Vol. 3 (Operating System Writer's Guide) (Intel, 1996), which is hereby incorporated herein by reference. Lastly, note that one skilled in the art may further modify prefetch request 82 to include alternative or still additional portions as compared with those described above.

Given the format of prefetch request 82, recall from above that it was introduced that access controller 22 may either issue a received prefetch request as is to L2 unified cache 20, suppress the fetch request, or modify it to cause a modified prefetch operation beginning at L2 unified cache 20. Note now that response indicator 84 provides an indication of which of these actions is to be taken. More particularly, in the preferred embodiment, the values of the bits in response indicator 84 indicate the response as shown in Table 2 below:

TABLE 2

| Indicator | Response To Be Taken |
| --- | --- |
| 000 | begin prefetch operation at L2 unified cache 20 according to prefetch request |
| 001 | suppress prefetch request |
| 010 | reserved |
| 011 | reserved |
| 100 | begin prefetch operation at L2 unified cache 20, and requesting 64 byte prefetch operation |
| 101 | begin prefetch operation at L2 unified cache 20, and requesting 128 byte prefetch operation |
| 110 | begin prefetch operation at L2 unified cache 20, and requesting 256 byte prefetch operation |
| 111 | begin prefetch operation at L2 unified cache 20, and requesting xx byte prefetch operation |

Given Table 2, one skilled in the art may identify the various responses which may be taken by access controller when it receives a prefetch request, as set forth by various examples below. Note also that only six responses are generally shown; nevertheless, because of 3 bit binary representation, a total of eight possibilities could be implemented. Thus, because only six of the eight binary representations are used, two indications (i.e., 010 and 011) are reserved for yet additional responses as may be selected by a person skilled in the art.

As one example of the Table 2 indications, note that if prefetch service block 80 outputs an indicator equal to 000, then the prefetch request received by access controller 22 is issued to begin a prefetch operation from L2 unified cache 20 starting at the address specified by the prefetch request received by access controller 22. In other words, an indicator of 000 indicates that prefetch service block 80 has determined, based on its input system parameters, that the requested prefetch is a justifiable activity and, therefore, it commences a prefetch operation to satisfy the prefetch request. Note that this indication may be reached in numerous circumstances given the input system parameters of FIG. 3. For example, if the address falls within a certain range, that range may suggest a prefetch is likely to be beneficial. A specific example of this incident is where the address of the prefetch request falls within the range of addresses known to include a common routine (or more than one such routine). In other words, often different programs will share a common routine which is sometimes referred to as a shared library. Therefore, such a routine is usually expected to be repeatedly used by those programs and, thus, the prefetch is likely to be beneficial; hence, for this as well as other examples ascertainable by a person skilled in the art prefetch service block 80 outputs the 000 pattern to instigate a prefetch operation corresponding to the prefetch request. Note also that the other system parameters of prefetch request 82 may similarly indicate the desirability of permitting a prefetch operation to occur. For example, in the above-incorporated U.S. patent application Ser. No. 09/000, 937 entitled "Microprocessor Circuits, Systems, And Methods Implementing a Load Target Buffer Having Entries Of Varying Lengths Based On Prefetch Desirability" (Attorney Docket Number TI25204), there is described an LTB which includes a confidence factor indicating the likelihood of a hit based on a prefetch request, that is, whether the address in the prefetch request will return data that will actually be later fetched by the instruction which gave rise to the prefetch request. Thus, this confidence factor also may be a system parameter to be evaluated by prefetch service block 80. Thus, given the above, one skilled in the art may ascertain various procedures for evaluating the above-described parameters either individually or in combination to determine that the requested prefetch is desirable and thereby permit the prefetch operation to go forward. As another example, therefore, if the "G" bit of the page table entry is set then this too may suggest a prefetch is likely to be beneficial. In any event, therefore, in response to the indication of 000, the prefetch operation is commenced at L2 unified cache 20 which responds by determining whether it stores information corresponding to the address. If so, the prefetch operation is complete. On the other hand, if L2 unified cache 20 does not store the desired information, then the prefetch operation accesses the next higher level memory to retrieve the information from that memory. In the current embodiment, therefore, external memory 14 is accessed at the address of the prefetch request, and the addressed information is then brought on chip to microprocessor 12. Moreover, in the preferred embodiment, this retrieved information is then stored in L2 unified cache 20.

While the above described placing the prefetched information directly in L2 unified cache 20, note as an alternative that an additional buffer may be associated with, or actually built as a part of, L2 unified cache 20, where that buffer is particularly constructed to receive prefetched information. For example, in a preferred implementation, this buffer would include several lines, such as four to eight lines, where each line would operate to store prefetched information. Such a structures are known in the art as prefetch buffers. In addition, each line may further store other items corresponding to the prefetched information, such as the address of the prefetched information, the type of access which caused the prefetch (i.e., the same indication as in portion 82d of prefetch request 82 of FIG. 3), and various other control information. Note also that if this alternative buffer is implemented, it too should be connected to be snooped in response to a snoop address from BIU 26 in the same manner as the other cache stores in microprocessor 12.

Having an appreciation of the prefetch operation discussed above, recall from the earlier discussion that in the preferred embodiment prefetch requests are directed first to L2 unified cache 20 rather than to a lower level cache (e.g., L1 data cache 18 or L1 instruction cache 18). Consequently, note that the prefetch operation occurs so as not to burden the lower cache level(s) with prefetch activity, thereby leaving those lower cache level(s) to service only other types of accesses (e.g., snoop access and fetch access). In an alternative embodiment, however, the prefetch request could be directed first to the lower cache level(s), in which case the request would propagate upward through the memory hierarchy until a hit was found or the information was retrieved to an on chip cache. Returning to the preferred technique of servicing a prefetch operation firstly at L2 unified cache 20 recall from the above that in the preferred embodiment L2 unified cache 20 is downward inclusive in its information, meaning that any information in a cache lower in order than L2 unified cache 20 is also stored in L2 unified cache 20. Again, therefore, if a prefetch operation is issued to L2 unified cache 20 resulting in a cache miss, then it is also known that none of the lower caches store the requested information as well and, therefore, it is beneficial to continue with the prefetch operation to bring the information on chip to L2 unified cache 20. Moreover, if a prefetch operation is issued to L2 unified cache 20 resulting in a cache hit, then it is known that the information is then available from L2 unified cache 20, and may even be available from a cache lower in the hierarchy as compared to L2 unified cache 20. In either location, therefore, the information is accessible in a relatively short time period as compared with having to retrieve it from an off chip resource.

As another example of the Table 2 indications, note that if prefetch service block 80 outputs an indicator equal to 001, then the prefetch request received by access controller 22 is suppressed. In other words, no further action is taken with respect to the received prefetch request. Again, this indication may be derived based on consideration of the system parameters in prefetch request 82 as shown in FIG. 3. In response to this indication, therefore, L2 unified cache 20 is not disturbed with the prefetch request, that is, the address of the prefetch request is not presented to L2 unified cache 20 and, therefore, L2 unified cache 20 is instead free to operate to service other requests.

As still another example of the Table 2 indications, note that the bottom four rows of Table 2 illustrated indicators from prefetch service block 80 also cause the prefetch operation to commence at L2 unified cache 20, but in each of those instances the indicator further specifies the size of information to be either confirmed in L2 unified cache 20 or retrieved into L2 unified cache 20. For example, an indicator of 100 causes a prefetch operation to commence at L2 unified cache 20 starting at the address received from the prefetch request, but requesting a total of 64 bytes (i.e., one line in L2 unified cache 20) beginning at that address. In response, the prefetch operation either confirms that L2 unified cache 20 stores this information, or it is retrieved from a higher level of memory. Note that indicators 101, 110, and 111 are similar in nature, but specify different sizes of information to be part of the prefetch operation. Indeed, with respect to indicator 111, Table 2 depicts a size of "xx", meaning the size may be adjusted to whatever desirable level as ascertained by a person skilled in the art. Given the above, the last four rows of Table 4 demonstrate that access controller 22 may consider the system parameters and, in response to those values, may explicitly specify a desirable non-zero size for the prefetch operation. This non-zero size, therefore, may be greater than or less than the actual requested size (i.e., portion 82b) of the original prefetch request 82 shown in FIG. 3.

From the above, one skilled in the art will appreciate that the above-described indicators from Table 2 permit access controller 22 to either issue a received prefetch request as is to L2 unified cache 20, suppress the prefetch request, or modify it and present a modified prefetch request to L2 unified cache 20. Note that each of these activities may be stated to have at least one common attribute, that is, in each instance access controller 22 effectively adjusts the size of the prefetch operation in response to the prefetch request and the system parameters. For example, to suppress the prefetch request, the size of the resulting prefetch operation is zero, that is, zero information is prefetched thereby effectively suppressing the prefetch. As another example, to re-issue the prefetch request, the size of the resulting prefetch operation is simply the same size as was requested by portion 82b of the prefetch request. Lastly, access controller 22 may modify the prefetch by changing the size of its access, with the bottom four rows of Table 2 depicting examples of potential prefetch sizes which may be desirable given the various system parameters considered by access controller 22.

Figure 4:
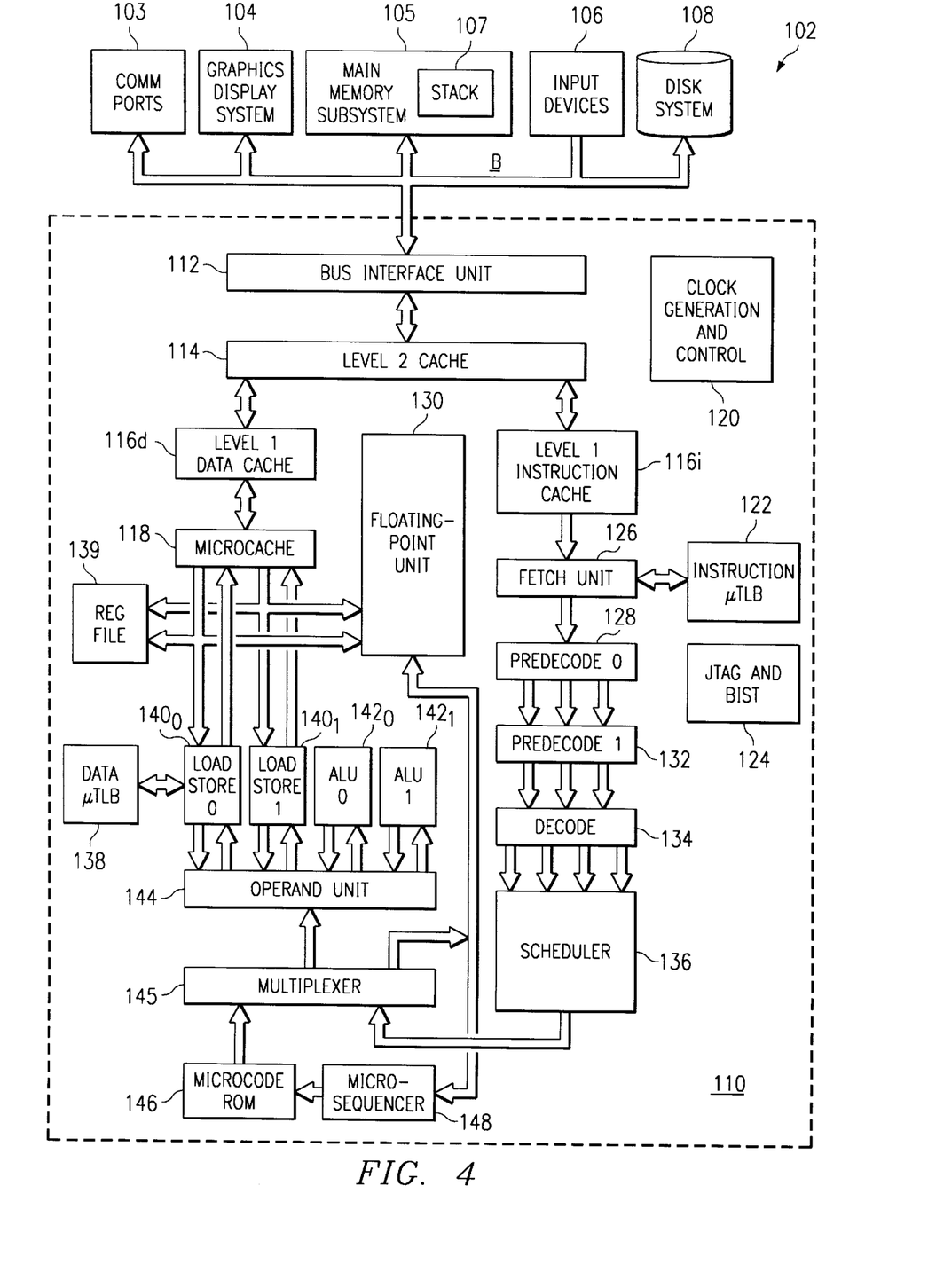
FIG. 4 illustrates an exemplary data processing system within which the preferred embodiments may be implemented.

Having described the above embodiments, FIG. 4 illustrates a block diagram of a microprocessor embodiment into which the above embodiments may be incorporated. FIG. 4 depicts an exemplary data processing system 102, including an exemplary superscalar pipelined microprocessor 110 within which the preferred embodiment is implemented, will be described. It is to be understood that the architecture of system 102 and of microprocessor 110 is described herein by way of example only, as it is contemplated that the present embodiments may be utilized in microprocessors of various architectures. It is therefore contemplated that one of ordinary skill in the art, having reference to this specification, will be readily able to implement the present embodiments in such other microprocessor architectures. It is further contemplated that the present invention may be realized in single-chip microprocessors and microcomputers or in multiple-chip implementations, with the manufacture of such integrated circuits accomplished according to silicon substrate, silicon-on-insulator, gallium arsenide, and other manufacturing technologies, and using MOS, CMOS, bipolar, BiCMOS, or other device implementations.

Microprocessor 110, as shown in FIG. 4, is connected to other system devices by way of bus B. While bus B, in this example, is shown as a single bus, it is of course contemplated that bus B may represent multiple buses having different speeds and protocols, as is known in conventional computers utilizing the PCI local bus architecture; single bus B is illustrated here merely by way of example and for its simplicity. System 102 contains such conventional subsystems as communication ports 103 (including modem ports and modems, network interfaces, and the like), graphics display system 104 (including video memory, video processors, a graphics monitor), main memory system 105 which is typically implemented by way of dynamic random access memory (DRAM) and includes a stack 107, input devices 106 (including keyboard, a pointing device, and the interface circuitry therefor), and disk system 108 (which may include hard disk drives, floppy disk drives, and CD-ROM drives). It is therefore contemplated that system 102 of FIG. 4 corresponds to a conventional desktop computer or workstation, as are now common in the art. Of course, other system implementations of microprocessor 110 can also benefit from the present embodiments, as will be recognized by those of ordinary skill in the art.

Microprocessor 110 includes a bus interface unit ("BIU") 112 that is connected to bus B, and which controls and effects communication between microprocessor 110 and the other elements in system 102. BIU 112 includes the appropriate control and clock circuitry to perform this function, including write buffers for improving throughput and including timing circuitry so as to synchronize the results of internal microprocessor operation with bus B timing constraints. Microprocessor 110 also includes clock generation and control circuitry 120 which, in this exemplary microprocessor 110, generates internal clock phases based upon the an input; the frequency of the internal clock phases, in this example, may be selectably programmed as a multiple of the frequency of the input clock.

As is evident in FIG. 4, microprocessor 110 has three levels of internal cache memory, with the highest of these as level 2 cache 114, which is connected to BIU 112. In this example, level 2 cache 114 is a unified cache, and is configured to receive all cacheable data and cacheable instructions from bus B via BIU 112, such that much of the bus traffic presented by microprocessor 110 is accomplished via level 2 cache 114, Of course, microprocessor 110 may also effect bus traffic around level 2 cache 114, by treating certain bus reads and writes as "not cacheable". Level 2 cache 114, as shown in FIG. 4, is connected to two level 1 caches 116; level 1 data cache $116_d$ is dedicated to data, while level 1 instruction cache $116_i$ is dedicated to instructions. Power consumption by microprocessor 110 is minimized by accessing level 2 cache 114 only in the event of cache misses of the appropriate one of the level 1 caches 116. Furthermore, on the data side, microcache 118 is provided as a level 0 cache, which in this example is a fully dual-ported cache.

As shown in FIG. 4 and as noted hereinabove, microprocessor 110 is of the superscalar type. In this example multiple execution units are provided within microprocessor 110, allowing up to four instructions to be simultaneously executed in parallel for a single instruction pointer entry. These execution units include two ALUs $142_0$, $142_1$ for processing conditional branch, integer, and logical operations, floating-point unit (FPU) 130, two load-store units $140_0$, $140_1$, and microsequencer 148. The two load-store units 140 utilize the two ports to microcache 118, for true parallel access thereto, and also perform load and store operations to registers in register file 139, as well as to the level 1 caches $116_d$ and $116_i$. Data microtranslation lookaside buffer (μTLB) 138 is provided to translate logical data addresses into physical addresses, in the conventional manner.

These multiple execution units are controlled by way of multiple pipelines with seven stages each, with write back. The pipeline stages are as follows:

| | |
|---|---|
| F | Fetch: This stage generates the instruction address and reads the instruction from the instruction cache or memory |
| PD0 | Predecode stage 0: This stage determines the length and starting position of up to three fetched x86-type instructions |
| PD1 | Predecode stage 1: This stage extracts the x86 instruction bytes and recodes them into fixed length format for decode |
| DC | Decode: This stage translates the x86 instructions into atomic operations (AOps) |
| SC | Schedule: This stage assigns up to four AOps to the appropriate execution units |
| OP | Operand: This stage retrieves the register and/or memory operands indicated by the AOps |
| EX | Execute: This stage runs the execution units according to the AOps and the retrieved operands |
| WB | Write back: This stage stores the results of the execution in registers or in memory |

Referring back to FIG. 4, the pipeline stages noted above are performed by various functional blocks within microprocessor 110. Fetch unit 126 generates instruction addresses from the instruction pointer, by way of instruction micro-translation lookaside buffer (μTLB) 122, which translates the logical instruction address to a physical address in the conventional way, for application to level 1 instruction cache $116_i$. Instruction cache $116_i$ produces a stream of instruction data to fetch unit 126, which in turn provides the instruction code to the predecode stages in the desired sequence. Speculative execution is primarily controlled by fetch unit 126, in a manner to be described in further detail hereinbelow.

Predecoding of the instructions is broken into two parts in microprocessor 110, namely predecode 0 stage 128 and predecode 1 stage 132. These two stages operate as separate pipeline stages, and together operate to locate up to three x86 instructions and apply the same to decoder 134. As such, the predecode stage of the pipeline in microprocessor 110 is three instructions wide. Predecode 0 unit 128, as noted above, determines the size and position of as many as three x86 instructions (which, of course, are variable length), and as such consists of three instruction recognizers; predecode 1 unit 132 recodes the multi-byte instructions into a fixed-length format, to facilitate decoding.

Decode unit 134, in this example, contains four instruction decoders, each capable of receiving a fixed length x86 instruction from predecode 1 unit 132 and producing from one to three atomic operations (AOps); AOps are substantially equivalent to RISC instructions. Three of the four decoders operate in parallel, placing up to nine AOps into the decode queue at the output of decode unit 134 to await scheduling; the fourth decoder is reserved for special cases. Scheduler 136 reads up to four AOps from the decode queue at the output of decode unit 134, and assigns these AOps to the appropriate execution units. In addition, the operand unit 144 receives and prepares the operands for execution, As indicated in FIG. 4, operand unit 144 receives an input from scheduler 136 and also from microcode ROM 148, via multiplexer 145, and fetches register operands, and/or memory operands via load/store units $140_0$ and or $140_1$, for use in the execution of the instructions. In addition, according to this example, operand unit 144 performs operand forwarding to send results to registers that are ready to be stored, and also performs address generation for AOps of the load and store type.

Microsequencer 148, in combination with microcode ROM 146, control ALUs 142 and load/store units 140 in the execution of microcode entry AOps, which are generally the last AOps to execute in a cycle. In this example, microsequencer 148 sequences through microinstructions stored in microcode ROM 146 to effect this control for those microcoded microinstructions. Examples of microcoded microinstructions include, for microprocessor 110, complex or rarely-used x86 instructions, x86 instructions that modify segment or control registers, handling of exceptions and interrupts, and multi-cycle instructions (such as REP instructions, and instructions that PUSH and POP all registers).

Microprocessor 110 also includes circuitry 124 for controlling the operation of JTAG scan testing, and of certain built-in self-test functions, ensuring the validity of the operation of microprocessor 110 upon completion of manufacturing, and upon resets and other events.

Given the description of FIG. 4, as well as the descriptions above such as those relating to the prior Figures, one skilled in the art may appreciate that system 10 of FIG. 1 may be incorporated in connection with various components shown in FIG. 4. For example, various of the pipeline stages of FIG. 4 may include prefetching capability. As another example, microprocessor 110 includes a cache hierarchy in the manner of FIG. 1 and therefore may benefit from implementation of the above embodiments. As another example, various related functionality may be further performed by the appropriate circuitry within FIG. 4.

From the above, it may be appreciated that the above embodiments provides numerous benefits in the context of cache access. For example, a single cache may include circuitry which prioritizes requests directed to snooping, actual fetching, and prefetching. As another example, prefetch requests may be accepted, modified, or suppressed. As still another example, while the microprocessor structures shown above may benefit from the present embodiments, still additional microprocessor types may benefit from the present embodiments as well. Consequently, while the present embodiments have been described in detail, various substitutions, modifications or alterations could be made to the descriptions set forth above without departing from the inventive scope which is defined by the following claims.

What is claimed is:

1. A microprocessor, comprising:

a cache circuit;

circuitry for issuing a prefetch request, wherein the prefetch request comprises an address and requests information of a first size from the cache circuit; and prefetch control circuitry, comprising:
  circuitry for receiving the prefetch request;
  evaluation circuitry for evaluating system parameters corresponding to the prefetch request; and
  circuitry, responsive to the evaluation circuitry, for determining a size of information for a prefetch operation starting at the address from the cache circuit, wherein the prefetch operation corresponds to the prefetch request;
  wherein the evaluation circuitry for evaluating system parameters corresponding to the prefetch request comprises circuitry for evaluating whether the address falls within a predetermined range;

wherein the microprocessor is operable to execute a plurality of programs; and wherein the predetermined range corresponds to an address range of a common routine used by the plurality of programs.

2. A microprocessor, comprising:

a cache circuit;

circuitry for issuing a prefetch request, wherein the prefetch request comprises an address and requests information of a first size from the cache circuit; and prefetch control circuitry, comprising:
  circuitry for receiving the prefetch request;
  evaluation circuitry for evaluating system parameters corresponding to the prefetch request;
  circuitry, responsive to the evaluation circuitry, for determining a size of information for a prefetch operation starting at the address from the cache circuit, wherein the prefetch operation corresponds to the prefetch request wherein the microprocessor comprises an x86 microprocessor; and wherein the evaluation circuitry for evaluating system parameters corresponding to the prefetch request comprises circuitry for evaluating a segment descriptor corresponding to the requested information.

3. The microprocessor of claim 2 wherein the segment descriptor corresponding to the requested information comprises a code segment descriptor corresponding to the requested information.

4. The microprocessor of claim 2 wherein the segment descriptor corresponding to the requested information comprises a stack segment descriptor corresponding to the requested information.

5. A microprocessor, comprising:

a cache circuit;

circuitry for issuing a prefetch request, wherein the prefetch request comprises an address and requests information of a first size from the cache circuit; and prefetch control circuitry, comprising:
  circuitry for receiving the prefetch request;
  evaluation circuitry for evaluating system parameters corresponding to the prefetch request;
  circuitry, responsive to the evaluation circuitry, for determining a size of information for a prefetch operation starting at the address from the cache circuit, wherein the prefetch operation corresponds to the prefetch request wherein the microprocessor comprises an x86 microprocessor; and wherein the evaluation circuitry for evaluating system parameters corresponding to the prefetch request comprises circuitry for evaluating a global bit of a page table entry corresponding to the requested information.

6. A microprocessor, comprising:

a cache circuit;

circuitry for issuing a prefetch request, wherein the prefetch request comprises an address and requests information of a first size from the cache circuit; and prefetch control circuitry, comprising:
  circuitry for receiving the prefetch request;
  evaluation circuitry for evaluating system parameters corresponding to the prefetch request;
  circuitry for storing a confidence factor indicating whether the address of the prefetch request will return data later fetched by an instruction; and
  circuitry, responsive to the evaluation circuitry and the circuitry for storing, for determining a size of information for a prefetch operation starting at the address from the cache circuit, wherein the prefetch operation corresponds to the prefetch request;
  wherein the circuitry for determining a size of information for the prefetch operation starting at the address from the cache circuit determines that the size of information for prefetch operation equals zero such that the prefetch request is effectively suppressed such that no prefetch operation occurs in the microprocessor when the confidence factor indicates that the address of the prefetch request will likely not return data later fetched by an instruction.

* * * * *